(12) United States Patent
Schuler

(10) Patent No.: US 7,387,507 B2
(45) Date of Patent: Jun. 17, 2008

(54) SCOOP FOR ICE CREAM AND THE LIKE

(75) Inventor: Troy Schuler, Rancho Cucamonga, CA (US)

(73) Assignee: Bradshaw International, Inc., Rancho Cucamonga, CA (US)

( * ) Notice: Subject to any disclaimer, the term of this patent is extended or adjusted under 35 U.S.C. 154(b) by 284 days.

(21) Appl. No.: 11/313,954

(22) Filed: Dec. 22, 2005

(65) Prior Publication Data

US 2007/0148273 A1 Jun. 28, 2007

(51) Int. Cl.
A23G 9/28 (2006.01)
B28B 1/00 (2006.01)
B29B 45/40 (2006.01)

(52) U.S. Cl. .................. 425/279; 425/276; 425/281; D7/681

(58) Field of Classification Search ................ 425/187, 425/221, 276, 278, 280, 281, 279; D7/681; 408/54, 55, 199, 203.5, 204, 205, 207; A23G 9/28
See application file for complete search history.

(56) References Cited

U.S. PATENT DOCUMENTS

| 4,595,321 | A | * | 6/1986 | Van Dalen | 408/205 |
| D335,070 | S | * | 4/1993 | Empie | D7/681 |
| 5,842,820 | A | * | 12/1998 | Lee et al. | 408/204 |
| 6,273,652 | B1 | * | 8/2001 | Wirth et al. | 408/203.5 |
| 6,416,309 | B1 | * | 7/2002 | Michlitsch et al. | 425/187 |
| 6,474,974 | B1 | * | 11/2002 | Horng | 425/283 |

* cited by examiner

Primary Examiner—Dah-Wei Yuan
Assistant Examiner—Magali P Theodore
(74) Attorney, Agent, or Firm—Birch, Stewart, Kolasch & Birch, LLP

(57) ABSTRACT

A scoop for ice cream and other frozen products having a part-spherical body with an open side defined by an irregular edge extending from a point to be pushed into the product, and from the point along a generally helically curved leading edge to be pushed into the product and turned to form a ball of product with an auger-like action. An elongated handle is secured to the body on the side opposite the point and has a flat side band that spirals from the body to the free end to facilitate gripping and turning.

18 Claims, 3 Drawing Sheets

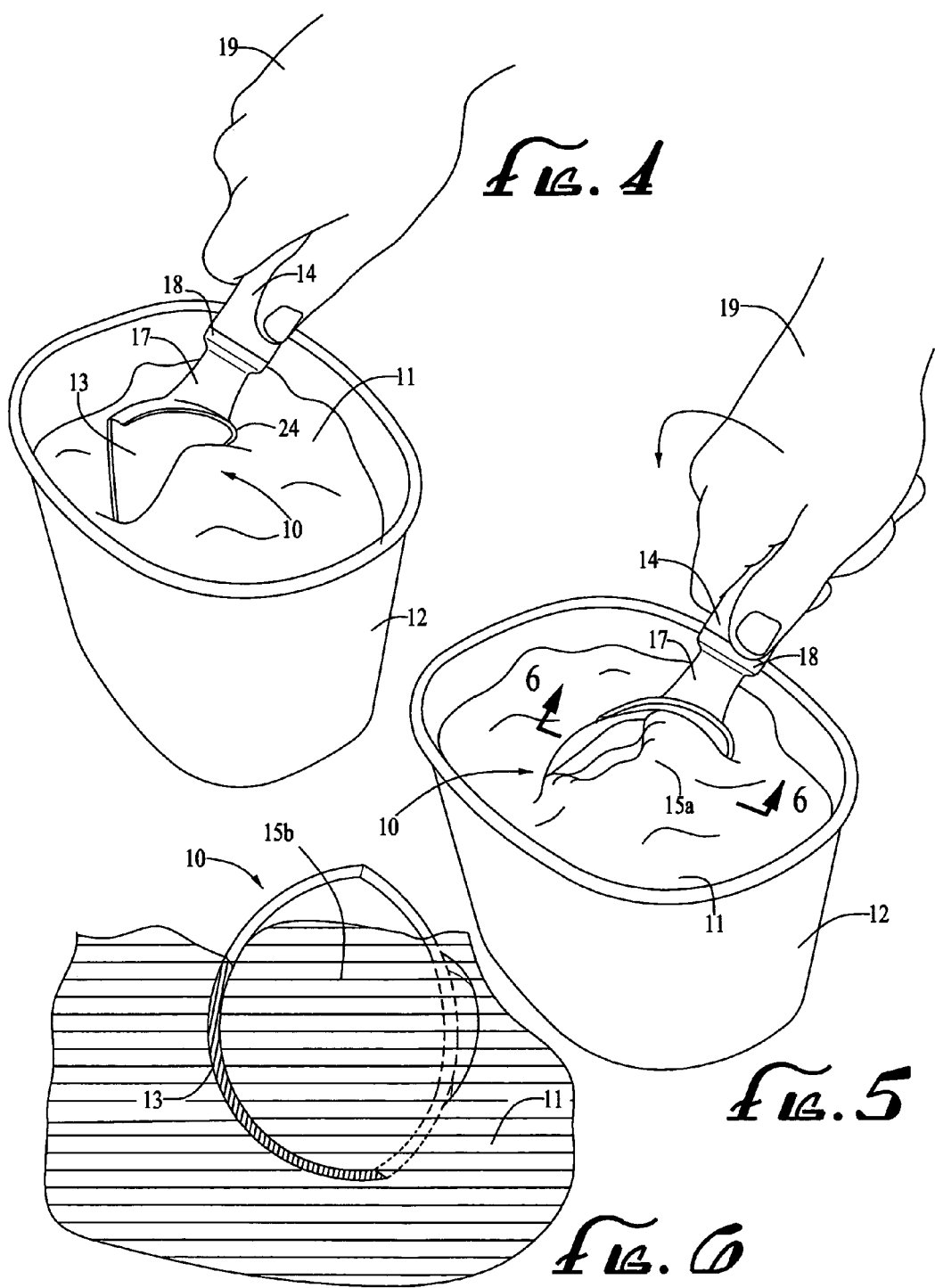

SCOOP FOR ICE CREAM AND THE LIKE

BACKGROUND OF THE INVENTION

This invention relates to hand tools for dispensing frozen confections such as ice cream, frozen yogurt and other solid foods that can be scooped out of a bulk container, and has particular reference to a scoop for frozen ice cream and the like of the type for forming a generally spherical "ball" of the product to be dispensed, for placement in a single-serving container or holder such as an edible cone. The term "ice cream scoop" is used herein to refer to a scoop that is usable for all such materials.

Scoops for frozen confections have been used for many years to dig into a bulk supply of a frozen product and remove a selected quantity of the product from a bulk container to be served to a consumer. Perhaps the most used configuration has a curved body forming a scoop blade that is mounted on a handle with which the user presses the blade into the bulk product and drags it across the surface to shear a layer of the product into the scoop. With this type, the sheared produced curls into the scoop and can be formed roughly into a "ball" shape for placement into a bowl or cone. Shearing the material can require a substantial amount of effort when the product is frozen solid and hard.

Another popular type of scoop has a semi-spherical or cup-shaped body forming the scoop, also with a sharpened edge to be forced into the material to fill the cup. This scoop also is capable of digging into or shearing away enough material to roll into the cup and into a spherical shape, usually by over-filling the semi-spherical cup. This type of scoop often is provided with a semi-circular release band in the cup that is operable by a thumb-activated lever to release the ball of product from the scoop. This type of scoop also requires a high level of force when used in hard material.

The present invention is an improvement in such scoops that is designed to reduce the amount of effort required and to facilitate the formation of spherically-shaped servings of frozen material, even when frozen very hard.

SUMMARY OF THE INVENTION

The present invention provides a novel scoop having a cup-shaped body that is generally part-spherical with a specially shaped cutting edge that is curved to extend from a pointed tip that easily penetrates hard-frozen material and along a generally helical path that enables the scoop to bore more easily into the frozen material. The pointed tip forms an entry hole into the frozen material and the cutting edge spirals into the material with an auger-like action to fill the scoop with substantially less effort than required with conventional scoops. Further, the preferred embodiment of the scoop has a handle with a special flat band on its surface that spirals from the body to the free end and facilitates the turning action of the scoop.

Other aspects and advantages of the invention will become apparent from the following detailed description and from the accompanying drawings.

BRIEF DESCRIPTION OF THE DRAWINGS

FIG. 4 is a perspective view on a slightly reduced scale showing a recommended position of the scoop and the user's hand during entry of the scoop into a bulk container of product to be dispensed;

FIG. 5 is a view similar to FIG. 4 with the scoop and the user's hand in moved positions, farther into the material;

FIG. 6 is an enlarged cross-sectional view taken substantially along line 6-6 of FIG. 5;

DETAILED DESCRIPTION OF THE PREFERRED EMBODIMENT

Figure 1:
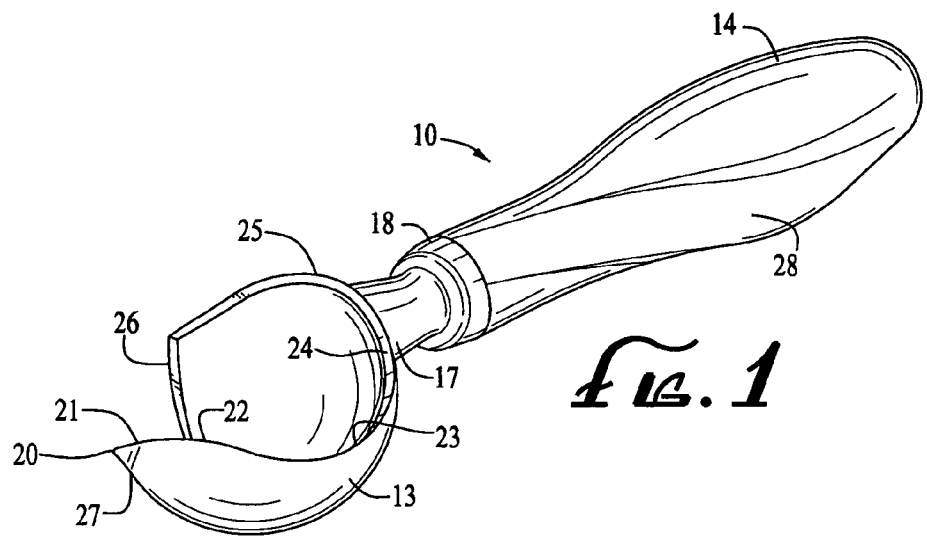
FIG. 1 is a front perspective view of a scoop for ice cream and the like incorporating the novel features of the present invention.

As shown in the drawings for purposes of illustration, the invention is embodied in a scoop, indicated generally by the reference number 10, for dispensing or serving a product 11, typically a frozen confection such as ice cream or frozen yogurt, from a bulk supply, herein a container 12 in the form of an open-topped tub. The scoop 10 has a generally part-spherical or cu-shaped body 13 that is mounted on one end of an elongated bundle 14, to be used in digging a quantity of the product 11 out of the container 12. A finished ball 15 of product is indicated by the broken line in FIG. 3 and stages of a partially formed ball are shown in FIGS. 4, 5 and 6 and indicated by the numbers 15a and 15b.

Figure 3:
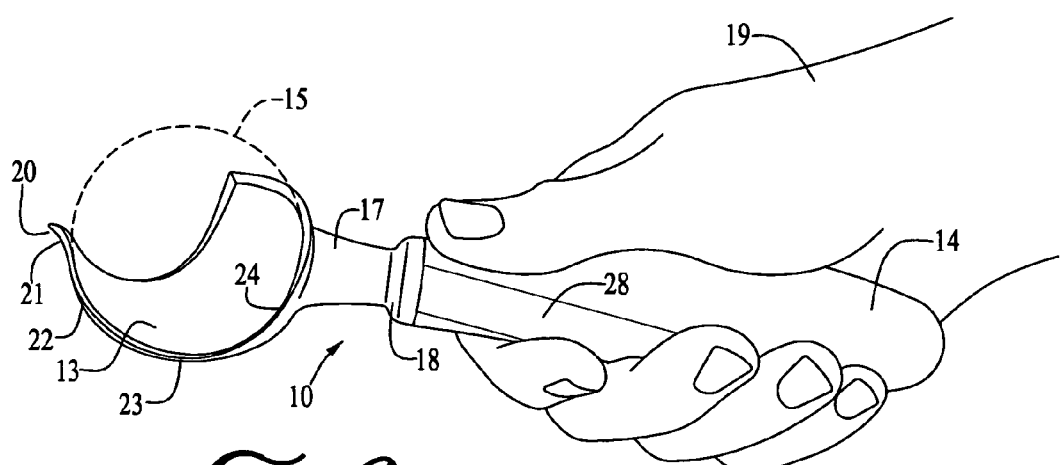
FIG. 3 is a view similar to FIG. 2 showing the scoop in the right hand of a user in an operative position and with a ball of ice cream or other product shown by a broken line.
Figure 7:
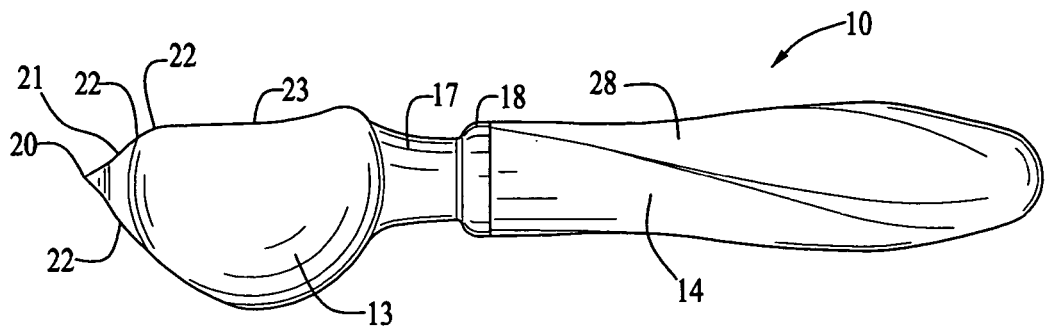
FIG. 7 is a rear side elevational view of the scoop.
Figure 8:
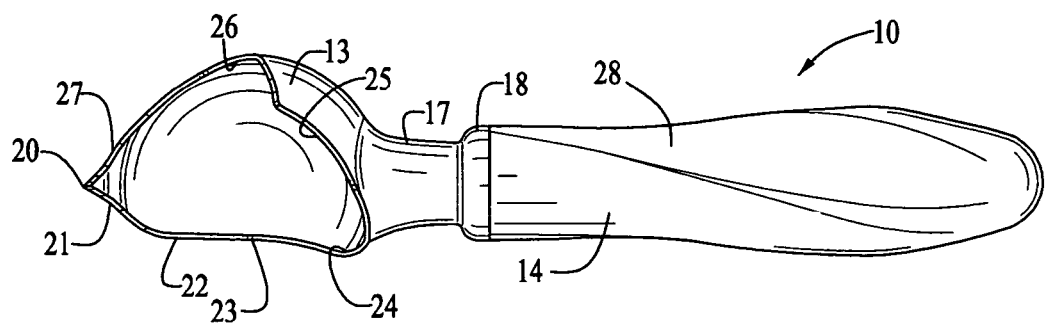
FIG. 8 is a top plan view of the scoop.
Figure 9:
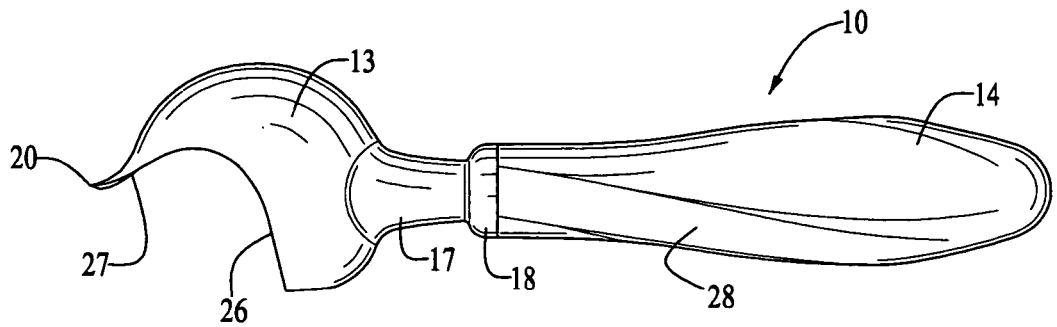
FIG. 9 is a bottom plan view of the scoop.

The body 13 typically is composed of metal and formed with a neck or stem 17 having a flanged seat 18 at its end for receiving one end of the handle 14, which preferably is a molded plastic part sized and shaped to be gripped in one hand 19 of a user, the right hand as shown in FIGS. 3-5. This handle is secured in the seat 18 in a manner that mounts the scoop body 13 securely in place, to sustain the forces that will be applied in scooping frozen product from the container 12.

In accordance with the present invention, the open side of the body 13 is defined by an irregularly and specially shaped peripheral edge that defines a pointed tip 20 on one side, to be pressed into the product to be dispensed, and a leading edge portion of the edge that begins at one tapered side 21 of the tip and curves across the leading edge portion with a generally helical curvature to be pushed and turned to bore into the product with an auger-like action. The scoop penetrates even hard-frozen material more easily because of the pointed tip 20, and separates a ball-shaped quantity 15 of the product more effectively as a result of the boring action.

Figure 2:
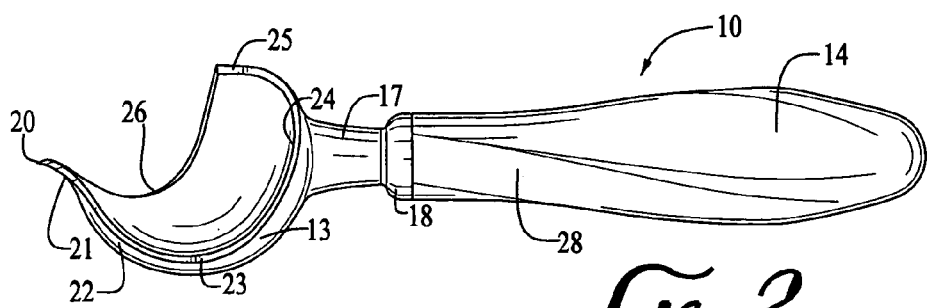
FIG. 2 is a front side elevational view of the scoop.

More specifically, as can best be seen in FIGS. 1 to 3, the tip 20 is formed on the side of the body 13 opposite the stem 17 and the handle 14 and curves outwardly to point away from the handle and to be inserted endwise into the product, as shown in FIG. 4. The leading edge portion of the body extends from the tapered side 21 of the tip first along a convex curve 22, and then across a shallow and somewhat elongated concave curve 23 extending almost to the stem 17. At this point, the peripheral edge curves convexly and transversely across the stem and across the longitudinal axis of the handle 14, forming a "heel" 24, and continues to the trailing edge portion 25 of the body, preferably then having a sharper concave curvature to form a recess or relief 26 that extends back to the trailing side 27 of the pointed tip. It should be noted that "leading edge" refers to the edge that is in advance during clockwise turning of the scoop, as viewed by the right-handled user.

With this irregular edge on the scoop, the body 13 is less than semi-spherical, but has a generally spherical curvature that will form a generally spherical ball 15, when pushed and turned into the product. The ball of product will roll up into the scoop, generally as shown in FIG. 3, for easy removal and serving.

A secondary aspect of the invention is a special configuration of the handle 14, which preferably is generally circular in cross-section and preferably becomes progressively larger from the stem to a point near the remote end. A flat band 28 is formed on one side of the handle, beginning at the flanged seat 18, generally aligned with the adjacent end of the leading edge, as shown in FIGS. 1 through 3, and twists around the handle with a gentle spiral to turn approximately one-quarter of the way around the handle. Thus, the band facilitates gripping and turning of the handle during use.

From the foregoing, it will be seen that the present invention provides a novel scoop 10 that is designed to be pressed into the material to be dispensed and turned to move into the material with an auger-like action, forming a ball 15 of the material more easily and more effectively in hard-frozen material than has been possible with prior scoops. It also will be evident that, while one embodiment of the invention has been illustrated and described, various modifications and changes may be made by those skilled in the art without departing from the invention.

The invention claimed is:

1. A scoop for dispensing ice cream and similar frozen products from a bulk container, comprising:
   a generally part-spherical body having an open side and a leading edge extending across the open side and positioned to cut into the product to be dispensed;
   an elongated handle secured to one side of said body and projecting outwardly therefrom to be gripped by a user;
   and a generally pointed tip on said body at the end of said leading edge remote from the handle, said tip extending away from the handle for insertion into the product upon endwise movement of scoop toward the product to facilitate penetration into hard frozen products; and
   said leading edge beginning on a side of said tip and curving generally helically across the body toward the handle, first convexly outwardly adjacent the tip and then concavely across the body to and end of the leading edge adjacent the handle, whereby the scoop can be pushed into the product and turned with an auger-like action to form a ball of the product in the scoop.

2. A scoop as defined in claim 1 wherein the tip tapers to a sharp point.

3. A scoop as defined in claim 1 wherein the concavely curved portion of the leading edge extends generally longitudinally of the handle.

4. A scoop as defined in claim 1 wherein the leading edge continues across the end of the handle and convexly curved forms a heel adjacent to the handle.

5. A scoop as defined in claim 4 wherein the trailing edge of the body is formed with a concave indentation leading to the trailing edge of the tip.

6. A scoop as defined in claim 1 wherein said handle is generally circular in cross-section and is formed with a flat longitudinal band beginning on one side adjacent to the end of the leading edge and curving around the handle to the opposite end with a generally spiral curvature.

7. A scoop as defined in claim 6 wherein the general spiral curvature of the handle traverses approximately one-quarter of a turn, and the handle is of progressively increasing thickness from adjacent the body to adjacent the end remote from the body.

8. A scoop for dispensing ice cream and similar frozen products from a bulk container, comprising:
   a generally part-spherical body having an open side, and an irregularly curved peripheral edge defining said open side;
   an elongated handle secured to said body and extending away from the body to be gripped by a user;
   and a pointed tip on said body on the side thereof opposite the handle for endwise insertion into the product to be dispensed;
   said peripheral edge having a leading edge portion extending across one side of said body from said tip to said handle and curving first convexly away from the tip and then concavely across the body in a shallow curve, whereby the scoop can be inserted tip-first into the product and turned with an auger-like action to form a ball of the product in the scoop.

9. A scoop as defined in claim 8 wherein the tip tapers to a sharp point.

10. A scoop as defined in claim 8 wherein the concavely curved portion of the leading edge extends generally longitudinally of the handle and leads to a convexly curved heel adjacent to the handle.

11. A scoop as defined in claim 8 wherein said handle is generally circular in cross-section and is formed with a flat longitudinal band beginning on one side adjacent the end of the leading edge and curving around the handle to the opposite end with a generally spiral curvature.

12. A scoop as defined in claim 11 wherein the general spiral curvature of the handle traverses approximately one-quarter of a turn, and the handle is of progressively increasing thickness from adjacent the body to adjacent the end remote from the body.

13. A scoop as defined in claim 8 wherein said peripheral edge extends from said tip to said handle generally longitudinally of the handle, then curves generally transversely across the handle, and then curves back to the tip along a concave path forming a recess in the trailing edge of the body.

14. A scoop for dispensing ice cream and similar products from a bulk container, comprising:
   a generally cup-shaped body having an open side, and a laterally projecting elongated handle on the body;
   said open side being defined by an irregular edge forming a pointed tip on one side of the body to be pushed in the product to be dispensed;
   and a leading edge portion curving generally helically from the tip across the body, to be pushed and turned with an auger-like action into the product to form a ball of the product in the scoop.

15. A scoop as defined in claim 14 wherein said tip is on a side of the body opposite the handle, to be pushed endwise into the product.

16. A scoop as defined in claim 15 wherein said leading edge portion begins on the tip as a tapered side thereof, curves convexly away from the tip, and then curves concavely across the body toward said handle.

17. A scoop as defined in claim 16 wherein said irregular edge curves from said leading edge portion concavely and transversely across the handle, and then extends back to the tip as a trailing edge portion.

18. A scoop as defined in claim 17 wherein said trailing edge portion has a concavely curved recess.

* * * * *